(12) United States Patent
Frackowiak

(10) Patent No.: US 8,347,453 B2
(45) Date of Patent: Jan. 8, 2013

(54) VACUUM CLEANER BAG DOCKING ASSEMBLY

(75) Inventor: Steven Frackowiak, Concord, OH (US)

(73) Assignee: Techtronic Floor Care Technology Limited, Tortola (VG)

(*) Notice: Subject to any disclaimer, the term of this patent is extended or adjusted under 35 U.S.C. 154(b) by 797 days.

(21) Appl. No.: 12/553,423

(22) Filed: Sep. 3, 2009

(65) Prior Publication Data

US 2010/0050372 A1 Mar. 4, 2010

Related U.S. Application Data

(60) Provisional application No. 61/094,280, filed on Sep. 4, 2008, provisional application No. 61/099,148, filed on Sep. 22, 2008.

(51) Int. Cl.
*A47L 9/14* (2006.01)

(52) U.S. Cl. ............ 15/350; 15/351; 15/DIG. 8; 55/376; 55/378

(58) Field of Classification Search .................... 15/347, 15/350, 351, DIG. 8; 55/374, 376, 378; *A47L 9/14*
See application file for complete search history.

(56) References Cited

U.S. PATENT DOCUMENTS

| | | | |
|---|---|---|---|
| 3,137,023 A | 6/1964 | Klinge et al. | |
| 3,283,481 A | 11/1966 | Studley et al. | |
| 3,870,491 A | 3/1975 | Friesen et al. | |
| 4,364,757 A | 12/1982 | Leonatti | |
| 5,970,575 A | 10/1999 | Lee | |
| 6,033,451 A | 3/2000 | Fish et al. | |
| 6,381,804 B1 | 5/2002 | Paterson et al. | |
| 6,406,507 B1 | 6/2002 | Paterson et al. | |
| 6,446,304 B1 | 9/2002 | Paterson et al. | |
| RE38,842 E | 10/2005 | Fish et al. | |
| 7,024,724 B2 | 4/2006 | Ponjican et al. | |
| 7,258,709 B2 | 8/2007 | Ponjican et al. | |
| 2007/0214755 A1 | 9/2007 | Corney et al. | |

FOREIGN PATENT DOCUMENTS

GB 1201841 8/1970

OTHER PUBLICATIONS

International Search Report and Written Opinion for corresponding International Application No. PCT/US2009/055848 mailed on Apr. 2, 2010.

*Primary Examiner* — David Redding
(74) *Attorney, Agent, or Firm* — Michael Best & Friedrich LLP

(57) ABSTRACT

A vacuum cleaner including a nozzle, an air conduit including a projecting tube, a suction source positioned to provide a flow of dirty air, a bag docking assembly, and a filter bag coupled to the bag carrier. The bag docking assembly includes a main body mounted to the air conduit. A bag carrier is configured to engage the main body and configured to move between a first position and a second position. A lever is coupled to the main body and the bag carrier and the lever is configured to move the bag carrier between the first position and the second position. The bag docking assembly is configured such that when the bag carrier is in the first position, the filter bag is not engaged with the projecting tube and when the bag carrier is in the second position, the filter bag is engaged with the projecting tube.

20 Claims, 11 Drawing Sheets

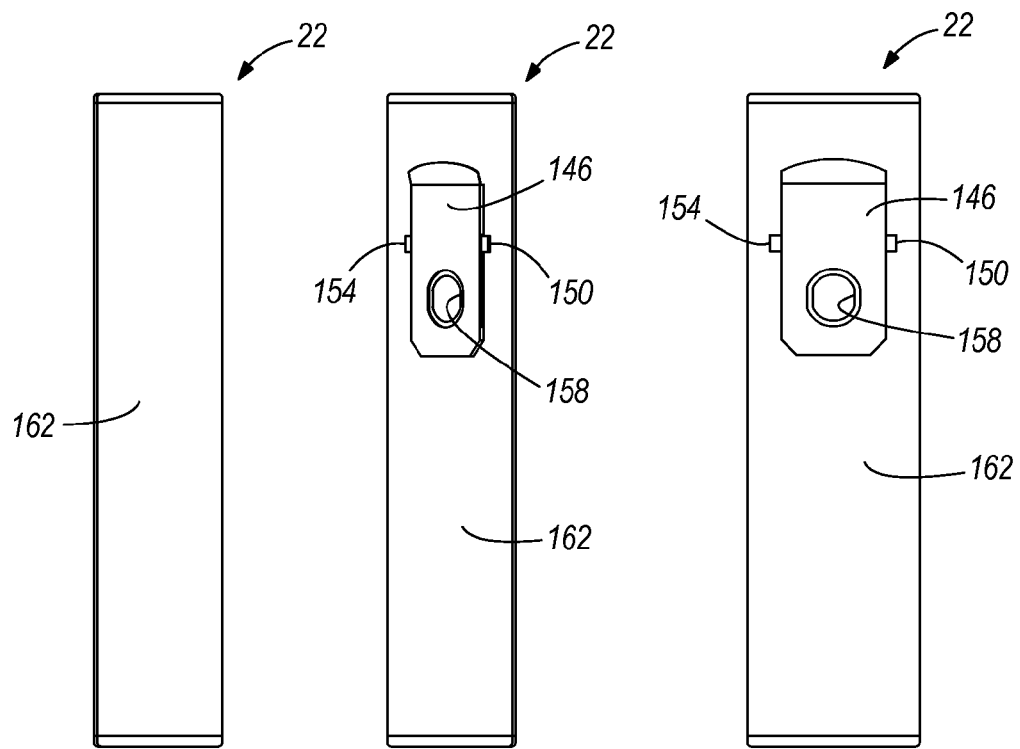
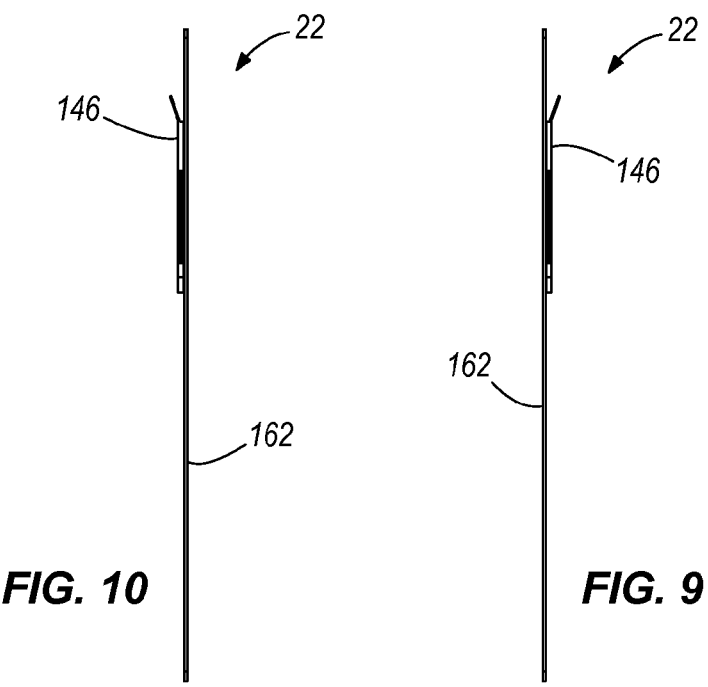

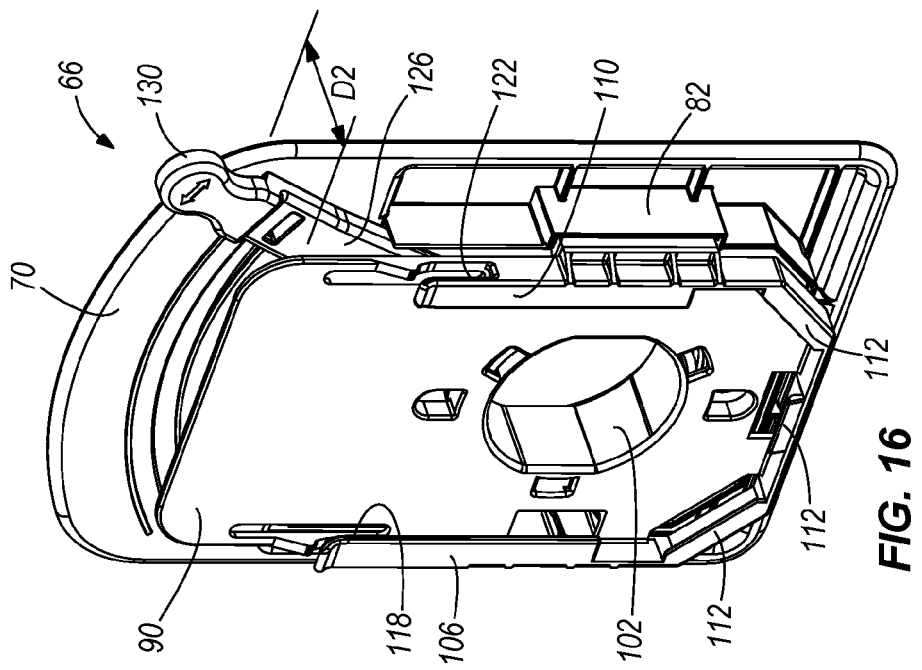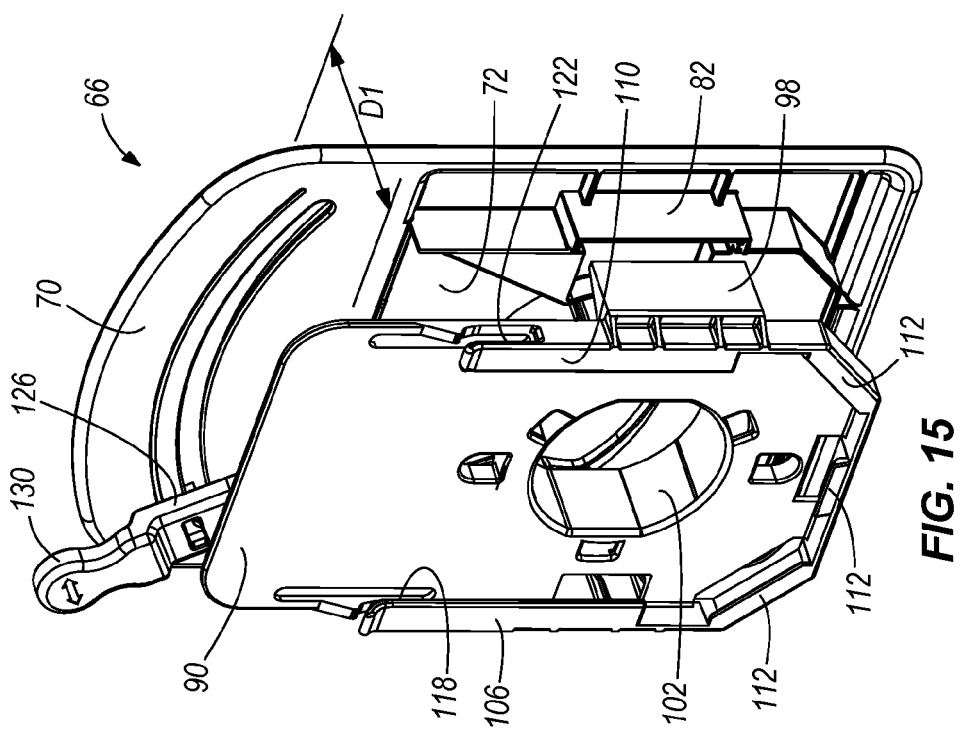

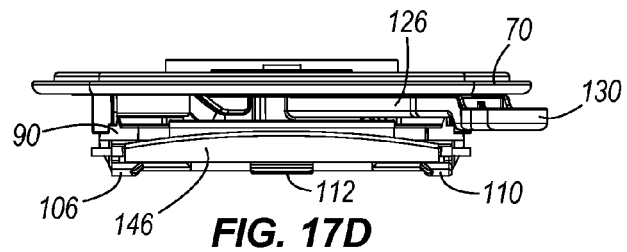
FIG. 17D
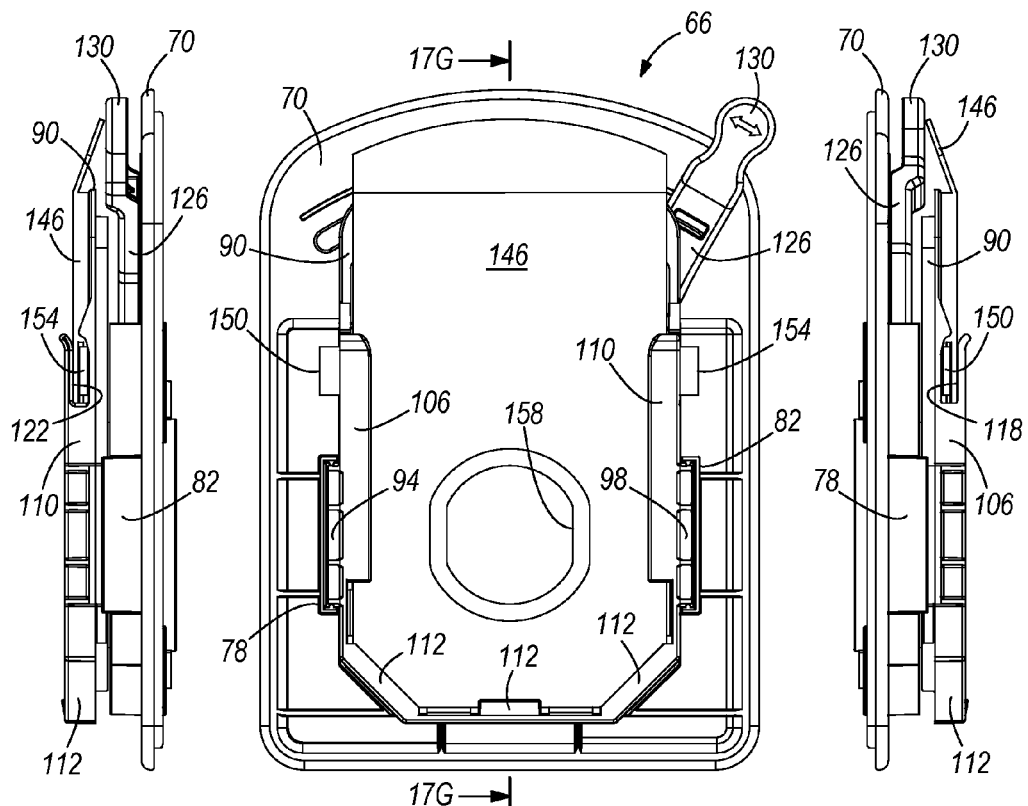
FIG. 17C FIG. 17A FIG. 17B
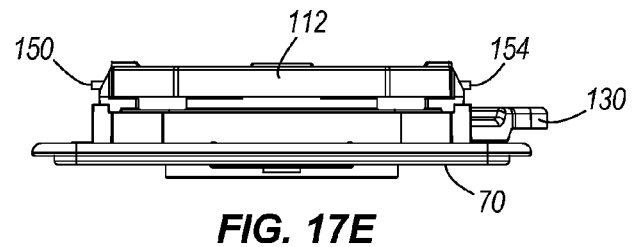
FIG. 17E

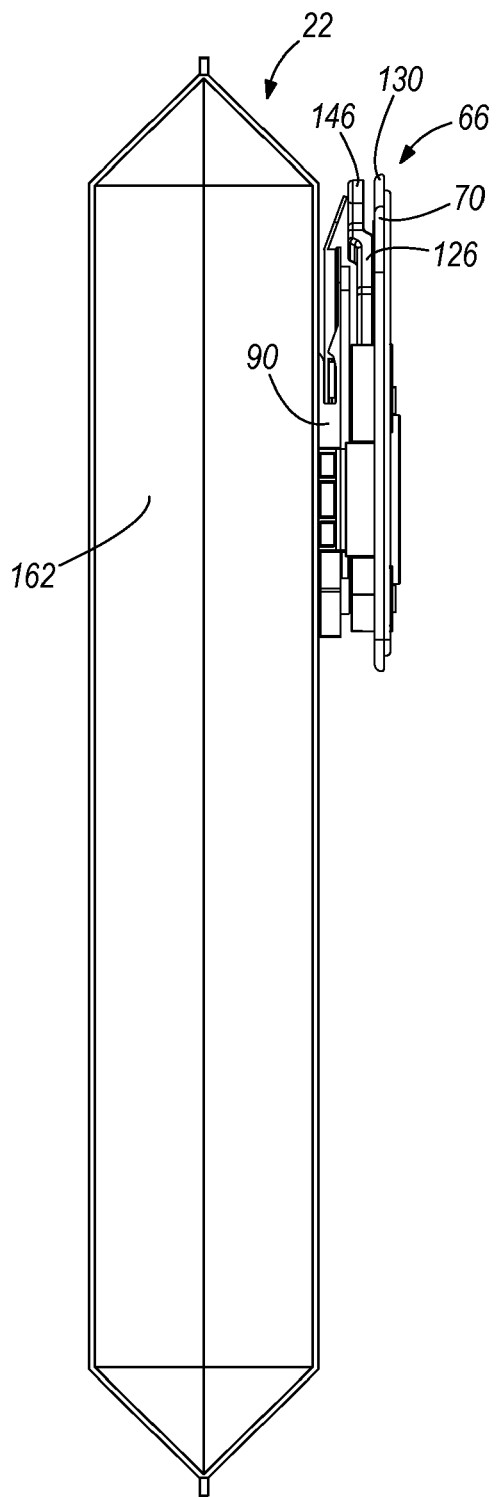
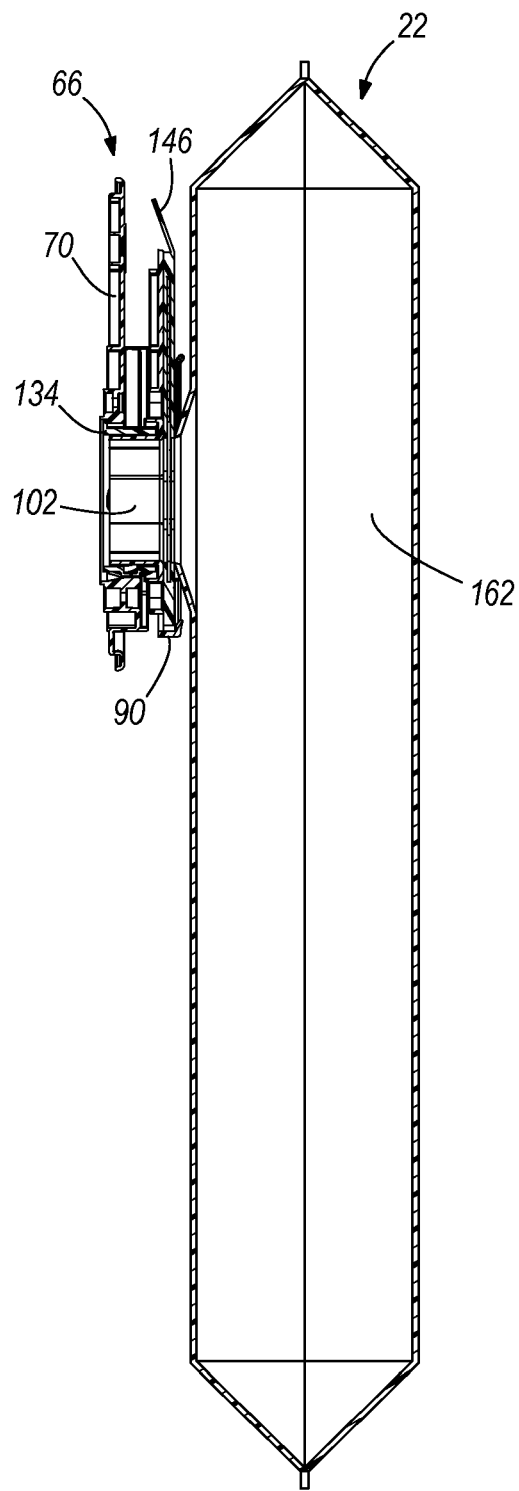
FIG. 22  FIG. 23

VACUUM CLEANER BAG DOCKING ASSEMBLY

RELATED APPLICATIONS

This patent application claims priority to U.S. Provisional Patent Application Ser. No. 61/094,280 filed Sep. 4, 2008 and U.S. Provisional Patent Application Ser. No. 61/099,148 filed Sep. 22, 2008, the entire contents of which are hereby incorporated by reference.

BACKGROUND

The invention relates to vacuum cleaners. More particularly, the invention relates to air filter bags and an attachment assembly for vacuum cleaners.

Upright vacuum cleaners are well known in the art. The two major types of traditional vacuum cleaners are a soft bag vacuum cleaner and a hard shell vacuum cleaner. In the hard shell vacuum cleaner, a source of suction generates the suction required to pull dirt from a carpet or floor surface being vacuumed through a suction opening and into a filter bag or other dust or particle separation device like a dust cup housed within the hard shell upper portion of the vacuum cleaner.

Typical vacuum cleaner filter bags have been provided with numerous attachment mechanisms or collar configurations for interfitting with inlet ducts carrying dirt laden air into the bags. These collars have been formed of materials such as cardboard, rubber, leather, plastic and combinations of some of these materials. To successfully function, a bag collar should be properly positioned and retained in position relative to an air inlet duct, and the bag collar should have an air seal established between itself and the inlet duct so as to inhibit dirt laden air from bypassing the filter bag. For example, a plastic collar may be fabricated with sealing lips adjacent to an aperture in the collar for sealing with the outer periphery of a circular air duct. Retention of the collar on the duct is accomplished by the frictional engagement of the collar and duct with a rib or stop on the duct to inhibit slippage of the collar from the duct.

Existing dirt collection bags, including various types of collars, are aligned with the dirt tube by sight and the collar of the bag is pressed onto the dirt tube. In an attempt to provide an easier to achieve seal between the bags to the dirt tube, mounting fixtures or docking mechanisms were developed. It is known to have a baseplate sewn or otherwise permanently attached to a rear interior surface of a vacuum bag cover. Such a cover can have an offset opening for the receipt of an end section or extension of the dirt tube. The aforementioned approaches to handling the docking of a dirt collection bag to a dirt tube of a dirty air vacuum cleaner requires the user to mechanically attach at least one of the bag and bag docking carrier by use of force from the user. Dependent upon the discretion and strength of the user this docking can vary and result in the faulty sealing of the bag to the dirt tube. If this happens dirt blows out from the tube and does not travel directly into the collection bag. Such improper bag installation results in the scattering of the dirt and dust picked up by the vacuum cleaner throughout the filter or bag housing or expelling the dirt and dust with the air blown from the vacuum cleaner back into the room to be cleaned.

SUMMARY

In one embodiment, the invention provides a vacuum cleaner that includes a nozzle, an air conduit that is in communication with the nozzle and includes a projecting tube, a suction source positioned to provide a flow of dirty air from the nozzle, through the air conduit, and out the projecting tube, a bag docking assembly, and a filter bag coupled to the bag carrier and configured to move therewith. The bag docking assembly includes a main body that is mounted to the air conduit and defines a first aperture sized to receive the projecting tube. A bag carrier is configured to engage the main body and configured to move between a first position wherein a first distance is defined between the bag carrier and the main body, and a second position wherein a second distance is defined between the bag carrier and the main body. The second distance is smaller than the first distance. A lever is coupled to the main body and the bag carrier and the lever is configured to move the bag carrier between the first position and the second position. The filter bag defines a second aperture that is configured to engage the projecting tube. The bag docking assembly is configured such that when the bag carrier is in the first position, the filter bag is not engaged with the projecting tube and when the bag carrier is in the second position, the filter bag is engaged with the projecting tube.

In another embodiment the invention provides a filter bag docking assembly for a vacuum cleaner that includes a filter bag with an opening therein for admitting dirt laden air into an interior portion of the filter bag and a collar defining an aperture therethrough configured for communicating with the opening in the filter body, the collar is secured to the filter body and extends outwardly from the aperture and includes a bag engagement element. The filter bag docking assembly includes a main body coupled to the vacuum cleaner, a bag carrier that includes a carrier engagement element that is configured to selectively engage the bag engagement element, and a lever that is coupled to the main body and the bag carrier and is configured to move between a first position and a second position. The filter bag docking assembly is configured such that when the lever is in the first position a first distance is defined between the bag carrier and the main body, and when the lever is in the second position a second distance is defined between the bag carrier and the main body. The first distance is smaller than the second distance.

In another embodiment the invention provides a filter bag docking assembly for a vacuum cleaner. The filter bag docking assembly including a main body that has a first surface and defines a main body aperture therethrough. The main body includes a body cam surface and a first guide element. The filter bag docking assembly also includes a bag carrier that defines a second surface corresponding to the first surface of the main body. The bag carrier includes a second guide element that extends substantially transversely from the second surface and is coupled to the first guide element of the main body, a carrier engagement element, and a tube that extends substantially transversely from the second surface and includes a carrier cam surface. The bag carrier is configured to move between a first position in which a first distance is defined between the first surface of the main body and the second surface of the bag carrier, and a second position in which a second distance in defined between the first surface of the main body and the second surface of the bag carrier. The first distance is smaller than the second distance. A lever is positioned between the main body and the bag carrier and couples the bag carrier to the main body. The lever includes a wall portion that defines a lever aperture. The wall portion is sized to be received within the main body aperture of the main body and the lever aperture is sized to receive the tube of the bag carrier. An exterior of the wall portion includes a first cam surface arranged to engage the body cam surface and an interior of the wall portion includes a second cam surface arranged to engage the carrier cam surface. The lever is configured to move between a first position and a second position, wherein the first cam surface and the second cam surface engage the body cam surface and the carrier cam surface, respectively, to drive the bag carrier between the first position and the second position. The filter bag docking assembly also includes a filter bag with an expandable body portion and a collar. The expandable body portion defines a bag aperture, the collar defines a collar aperture that corresponds with the bag aperture, and a bag engagement member that is configured to engage the carrier engagement member. The filter bag is mounted to the bag carrier at least partially by engaging the bag engagement member with the carrier engagement member such that the filter bag moves with the bag carrier between the first position and the second position.

One aspect of the invention provides vacuum cleaner with a bag collar mechanism for a floor care appliance to make the removal and assembly of an internal dirt collection bag easier by utilizing a cam actuated device. The design incorporates a cam handle that is configured to rotate to engage or disengage the dirt collection bag. Moving the cam handle to a disengaged position will disengage the dirt collection bag from the dirt tube, allowing the user to remove the bag from the vacuum cleaner. Moving the cam handle to the left results in the bag carrier moving horizontally pulling the bag from the dirt tube and disengaging the collection bag seal from the dirt tube. Once the handle is rotated to the fully disengaged position the user can then slide the bag out of the bag carrier. When replacing a bag the user slides the bag into the bag carrier slots and rotates the handle to the right. Rotating the handle to the right moves the bag carrier horizontally engaging the collection bag seal to the dirt tube and locking the bag in place for use. The main benefit of this device is that the actuation of the cam handle easily and positively engages and disengages the collection bag from the dirt tube ensuring proper sealing when engaged and proper disengagement when the bag needs to be removed for replacement.

In accordance with one aspect of the present disclosure, the aforedescribed dirt collection bag docketing assembly attached to the dirt tube of a floor care appliance such as a cleaning appliance with a suction source for vacuum cleaning. Such an appliance with a dirt collection bag is usually a direct air system. Such a system has the source of suction for picking up dirt and dust and debris through a nozzle arrangement within or attached for fluid flow to a housing having an impeller and electric motor. The impeller and motor in fluid flow association with the nozzle with one or more fluid pathway chambers or conduits combine to function as a source of suction for the vacuum cleaner. In such an embodiment, the direct air system vacuum cleaner is also referred to as a dirty fan system. A direct air system or dirty fan system is a system that has its impeller in direct contact with fluid such as air containing dirt, dust and/or debris suctioned up at the intake section of the at least one fluid pathway of the nozzle. A clean fan system is a system that separates the vacuumed air from the entrained dirt dust and/or debris prior to the air reaching vacuum impeller. The fluid flow away from the impeller is towards the dirt tube and the dirt collection bag.

However in another aspect of the present disclosure the dirt collection bag and docking assembly can be used in a clean air system with a filter at one end of the dirt collection bag away from the docking assembly for attachment to a pathway to the impeller and motor to provide the source of suction.

Other aspects of the invention will become apparent by consideration of the detailed description and accompanying drawings.

BRIEF DESCRIPTION OF THE DRAWINGS

FIG. 6 is a front view of a dirt collection bag for use with the docking assembly of the vacuum cleaner of FIG. 1, a collar is attached to the dirt collection bag.

FIG. 7 is a back view of dirt collection bag of FIG. 6.

FIG. 8 is a perspective view of the dirt collection bag of FIG. 6.

FIG. 9 is a left side view of the dirt collection bag of FIG. 6.

FIG. 10 is a right side view of the dirt collection bag of FIG. 6.

FIG. 15 is a perspective view of the docking assembly of the vacuum cleaner of FIG. 1 in a first position.

FIG. 16 is a perspective view of the docking assembly of the vacuum cleaner of FIG. 1 in a second position.

FIGS. 17A-F are the front, left side, right side, top, bottom, and back views of the docking assembly.

FIG. 22 is a left side view of the dirt collection bag associated with the docking assembly.

FIG. 23 is a sectional view of the dirt collection bag associated with the docking assembly taken along the line 23-23 of FIG. 18.

DETAILED DESCRIPTION

Figure 1:
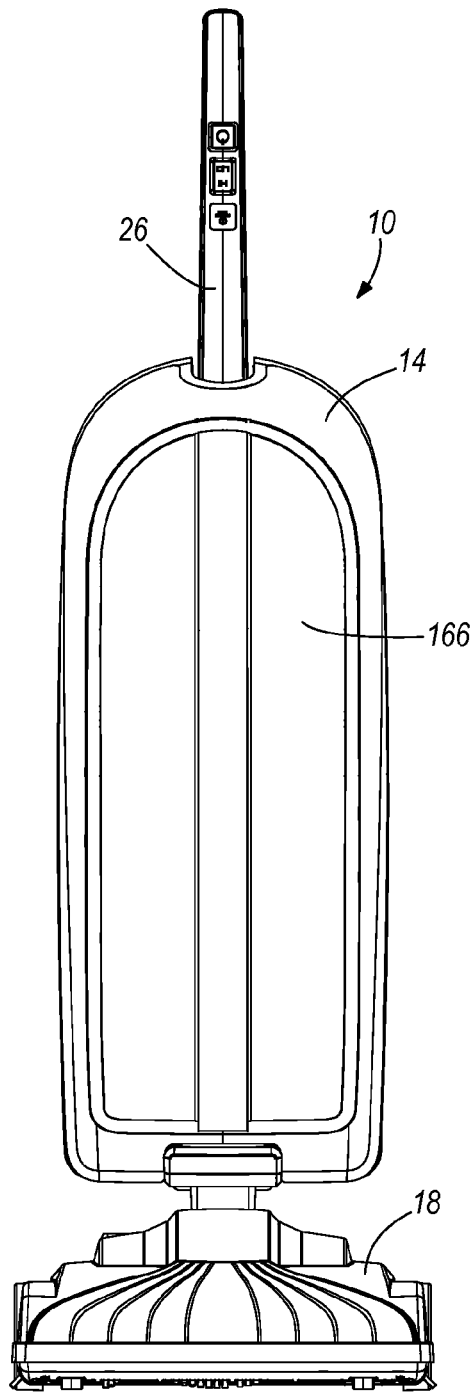
FIG. 1 is a front view of an upright vacuum cleaner that can have a dirty air conduit as part of a handle assembly where a connecting conduit extends from the dirty air conduit handle portion to inside a cover bag that houses a dirt collection bag associated with a docking assembly according to one construction of the invention.
Figure 2:
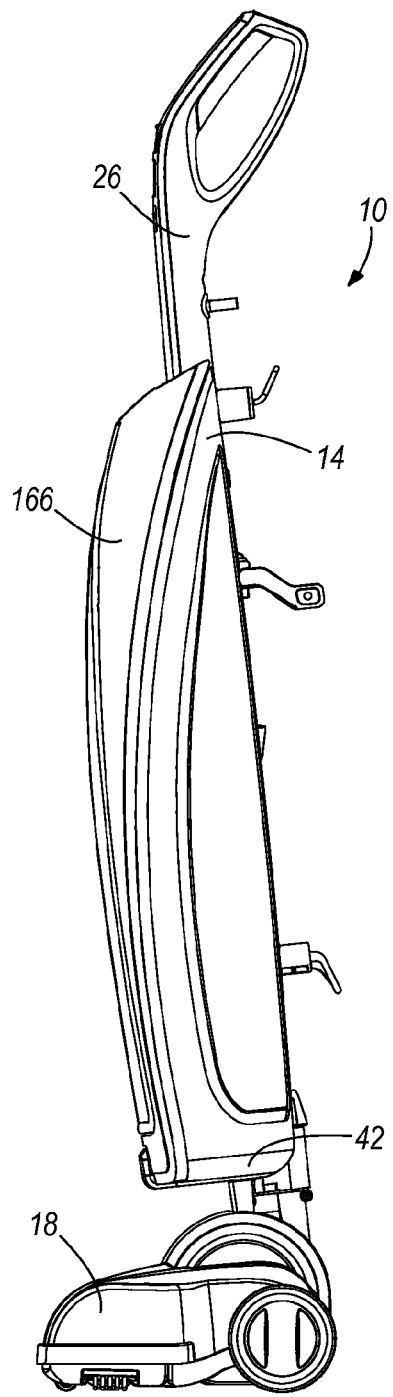
FIG. 2 is a right side view of the upright vacuum cleaning of FIG. 1.
Figure 5:
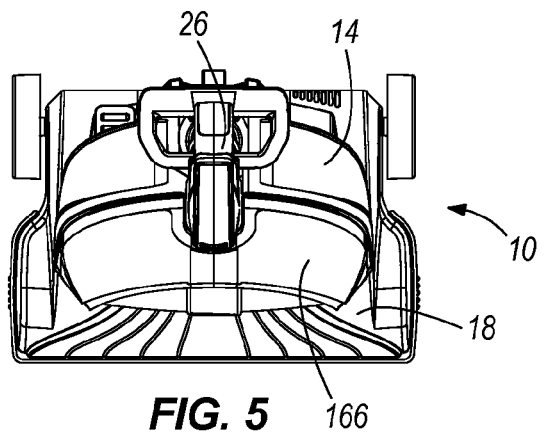
FIG. 5 is a top view of the upright vacuum cleaning of FIG. 1.
Figure 4:
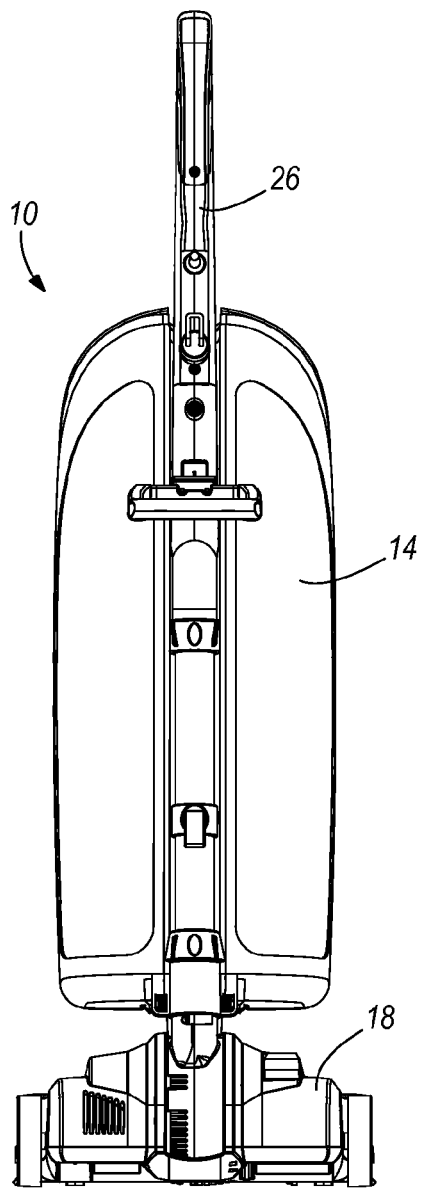
FIG. 4 is a back view of the upright vacuum cleaning of FIG. 1.
Figure 3:
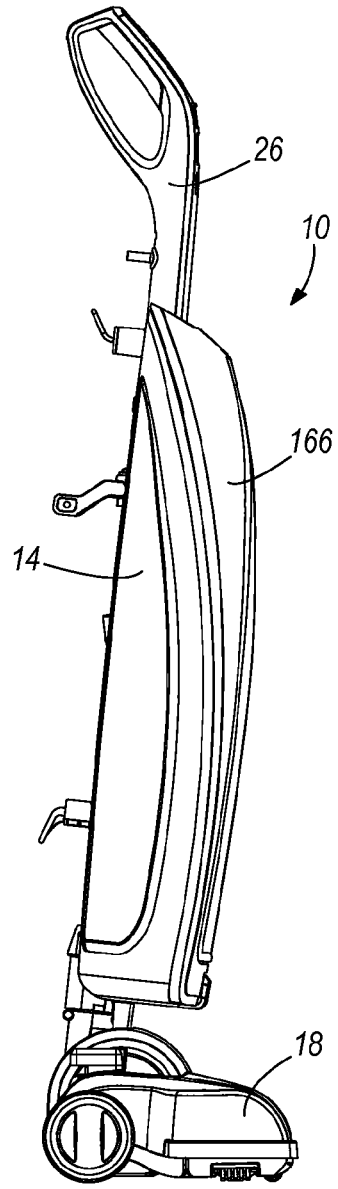
FIG. 3 is a left side view of the upright vacuum cleaning of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. It will also be appreciated that the various identified components of the cyclonic vacuum cleaner disclosed herein are merely terms of art that may vary from one manufacturer to another and should not be deemed to limit the present disclosure.

In the illustrated vacuum cleaner 10, dirt, dust and other particles are removed from a surface being cleaned (e.g., a carpeted floor) via suction being created at the nozzle portion. The dirt is then transmitted via pressurized air through an air inlet duct to a dirt collection filter bag connected thereto. The filter bag includes a collar and a filter body portion having a generally tubular configuration which is formed of air-pervious filtering material such as, for example, cloth fabric or paper. The tubular body portion filters the dirt laden air and traps or collects the dirt in the interior portion thereof. The filtered or clean air emanates from the filter bag and is exhausted to atmosphere through a perforated outer bag or jacket encompassing the dirt collection filter bag.

FIGS. 1-5 show an upright vacuum cleaner 10 according to one construction of the invention. The vacuum cleaner 10 includes an upper housing assembly 14 or outer bag or jacket, a nozzle base 18, and a dirt collection filter bag 22 (shown in FIGS. 6-9) that is supported within the upper housing assembly 14. The upper housing assembly 14 and the nozzle base 18 can be pivotally or hingedly connected through the use of trunnions or another suitable hinge assembly, so the upper housing assembly 14 pivots between a generally vertical storage position (shown in FIGS. 1-5) and an inclined use position. The nozzle base 18 can be made from conventional materials, such as molded plastics and the like. A handle assembly 26 extends upward from the upper housing assembly 14 by which an operator of the vacuum cleaner 10 is able to grasp and maneuver the vacuum cleaner 10. During vacuuming operations, the nozzle base 18 travels across a floor, carpet, or other surface to remove dirt, dust, or other particles from the surface.

Figure 11:
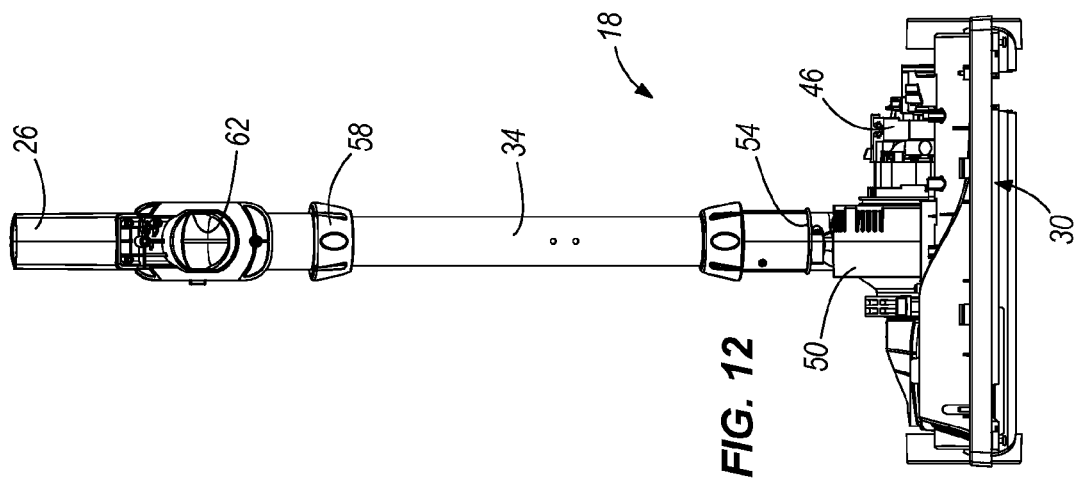
FIG. 11 is a perspective view of the dirty air conduit in fluid flow relationship with a suction motor on the foot of the upright vacuum cleaner of FIG. 1. The dirty air conduit has a connecting duct to allow attachment of the docking assembly and the dirt collection bag.

FIGS. 10 and 11 show the nozzle base 18 of the vacuum cleaner 10 more clearly. An underside of the nozzle base 18 includes a nozzle in the form of a main suction opening 30 formed therein, which can extend substantially across the width of the nozzle base 18 at a front end thereof. The main suction opening 30 is in fluid communication with the dirt collection filter bag 22 through a dirty air conduit 34. A rotating brush assembly (not shown) is positioned in the region of the main suction opening 30 for contacting and scrubbing the surface being vacuumed to loosen embedded dirt and dust. A plurality of wheels 38 support the nozzle base 18 on the surface being cleaned and facilitates movement thereacross. A base member 42 is coupled to the dirty air conduit 34 for releasably supporting the upper housing assembly 14 (see FIG. 2). A latch assembly (not shown) can be mounted to the base member 42 for securing the upper housing assembly 14 thereto.

With continued reference to FIGS. 10 and 11, an air-stream suction source in the form of an electric motor 46 and fan assembly 50, is supported by the nozzle base 18. The electric motor 46 and fan assembly 50 can be housed in a motor housing (not shown) which comprises a portion of the nozzle base 18. The motor 46 and fan assembly 50 generate the required suction airflow for cleaning operations by creating a suction force in the main suction opening 30 and an exhaust force in an exhaust outlet 54 of the fan assembly 50. The electric motor 46 and fan assembly 50 selectively establish and maintain a flow of air from the main suction opening 30 to the exhaust outlet 54. The exhaust outlet 54 is coupled to the dirty air conduit 34 such that the air-stream passes from the main suction opening 30 to the dirty air conduit 34 via the fan assembly 50.

Figure 12:
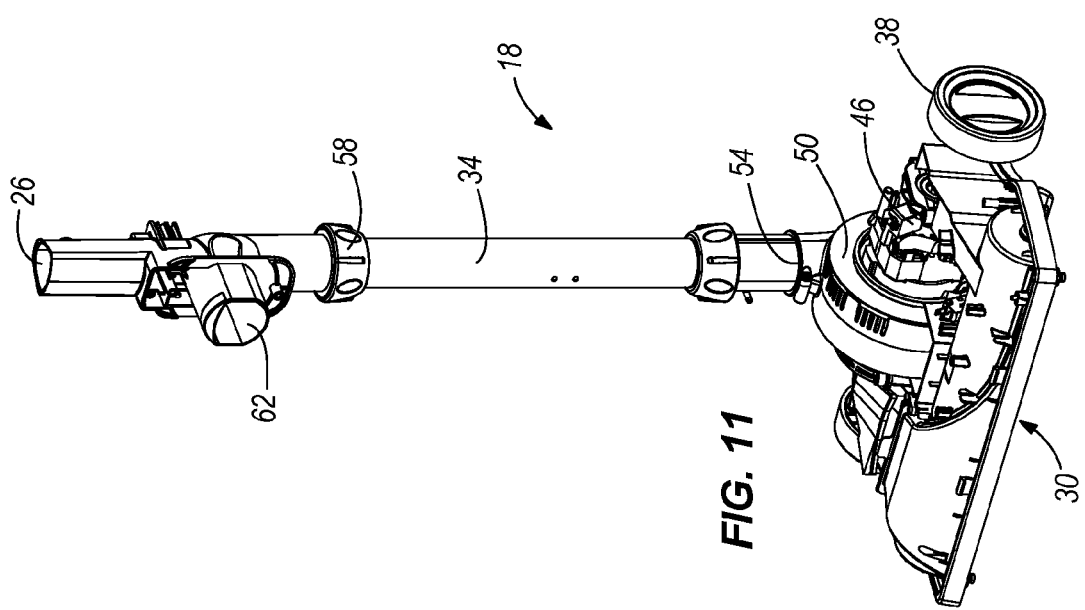
FIG. 12 is a front view of the assembly shown in FIG. 11.

FIG. 12 shows the handle assembly 26 in more detail. A connecting portion 58 couples the handle assembly 26 to the dirty air conduit 34 (see FIGS. 10 and 11). A projecting tube in the form of a dirt tube 62 is formed in the handle assembly 26 and is in communication with the connecting portion 58 such that the air-stream flows from the main suction opening 30, through the dirty air conduit 34, then through the dirt tube 62.

Figure 13:
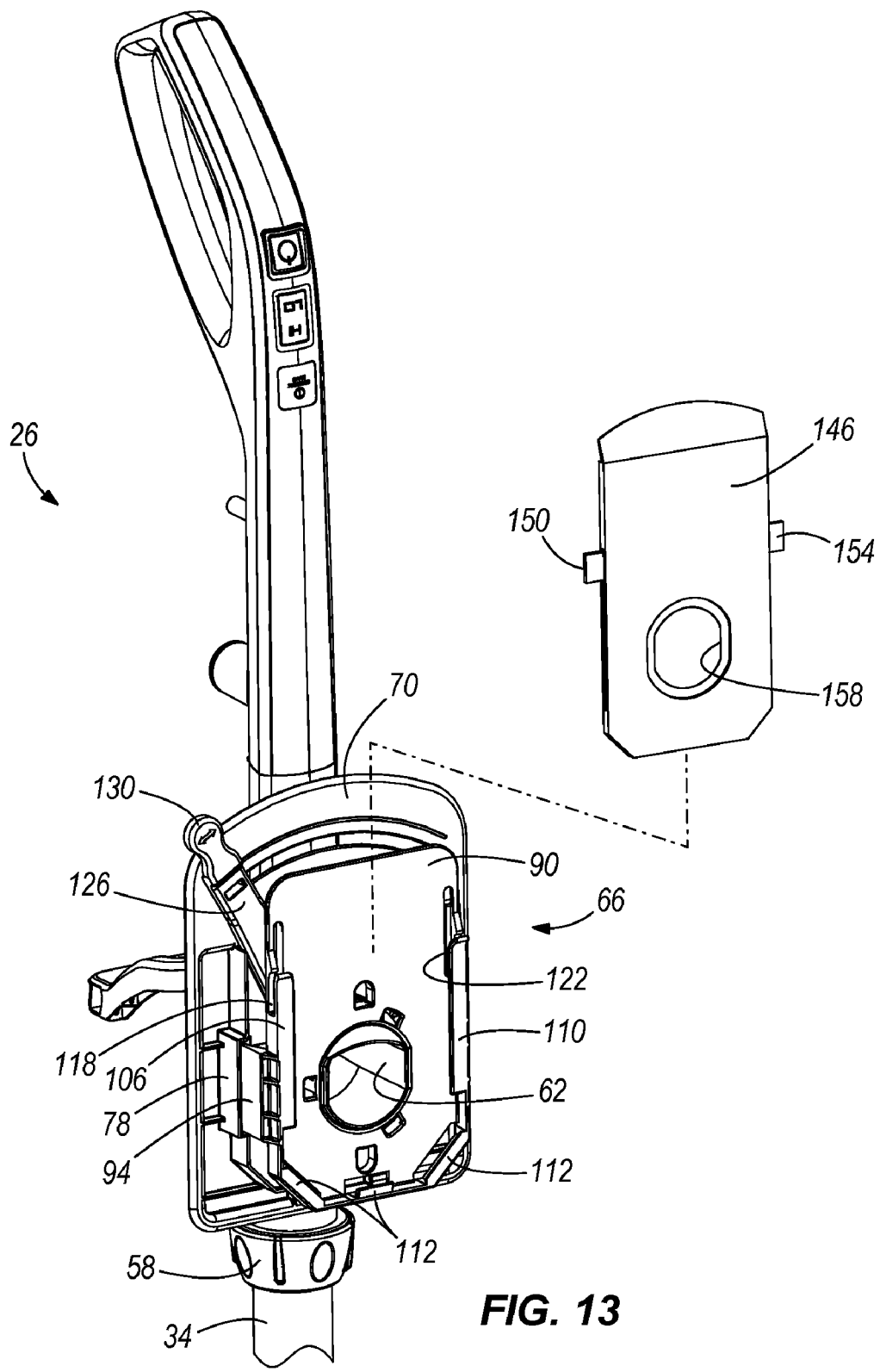
FIG. 13 is a perspective view of the docking assembly attached to a handle of the upright vacuum cleaner of FIG. 1. The collar of the dirt collection bag is shown with side tabs that are associated with the docking assembly.

A docking assembly 66 is coupled to the handle assembly 26 as shown in FIG. 12. FIG. 13 shows the docking assembly 66 exploded. A main body 70 is coupled directly to the handle assembly 26 and remains substantially stationary throughout operation of the docking assembly 66. The main body 70 includes a wall 72 that defines a main body aperture or aperture 74 though which the dirt tube 62 passes, a guide element in the form of a first recess 78 and a second recess 82, and a main body cam element in the form of protrusions 86.

A bag carrier 90 is slidingly mated to the main body 70 and includes a guide element in the form of a first tab 94 sized to be received within the first recess 78 and a second tab 98 (see FIG. 14) sized to be received within the second recess 82. The first tab 94 and the second tab 98 slide within the first recess 78 and the second recess 82, respectively, such that the wall 114 of the bag carrier 90 moves toward and away from the wall 72 of the main body 70 while maintaining a substantially parallel relationship thereto. A tube 102 is formed in the bag carrier 90 and receives the dirt tube 62. A bag carrier cam element in the form of protrusions 104 is positioned on the exterior of tube 102. The bag carrier 90 also includes a bag engagement element in the form of a first slot 106 and a second slot 110 extending outward from a wall 114. The first slot 106 includes a recess 118, and the second slot 110 includes a recess 122. The bag engagement element also includes several slots 112 positioned around a periphery of the bag carrier 90.

A lever in the form of a cam handle 126 is arranged between the main body 70 and the bag carrier 90. The cam handle 126 includes a user interface in the form of a lever 130, a cylindrical portion 134 sized to be received within the aperture 74 and defining a lever aperture to fit over the tube 102, a main body cam surface 138 formed on the exterior of the cylindrical portion 134, and a bag carrier cam surface 142 on the interior of the cylindrical portion 134. The main body cam surface 138 engages the protrusions 86 formed on the main body 70 and the bag carrier cam surface 142 engages the protrusions 104 formed on the bag carrier 90.

Turning now to FIG. 6, the dirt collection filter bag 22 includes a collar 146 that includes a bag engagement element in the form of a first tab 150 and a second tab 154, and a closable bag door 156, and defines a collar aperture 158. The first tab 150 is sized to be held by the bag carrier 90 and received within the recess 118 of the first slot 106. The second tab 154 is sized to be held by the bag carrier 90 and received within the recess 122 of the second slot 110. The aperture 158 is sized to engage the dirt tube 62 and press-fit therearound. The collar 146 can be formed of cardboard material, flexible plastic material such as, for example, polystyrene or polyethylene. Although the collar 146 could be molded of polyethylene, it is believed that the collar 146 can be fabricated more economically by vacuum forming from polystyrene to save material and minimize tooling expense. The collar 146 is secured to an expandable body portion 162 of the dirt collecting filter bag 22 by glue, although it may be secured thereto by other suitable means such as sewing. The expandable body portion 162 defines a bag aperture (not shown) that corresponds to the collar aperture 158 formed in the collar 146 such that the air-stream or dirty air-stream may pass from the dirt tube 62 through the collar 146 and into the expandable body portion 162.

Figure 14:
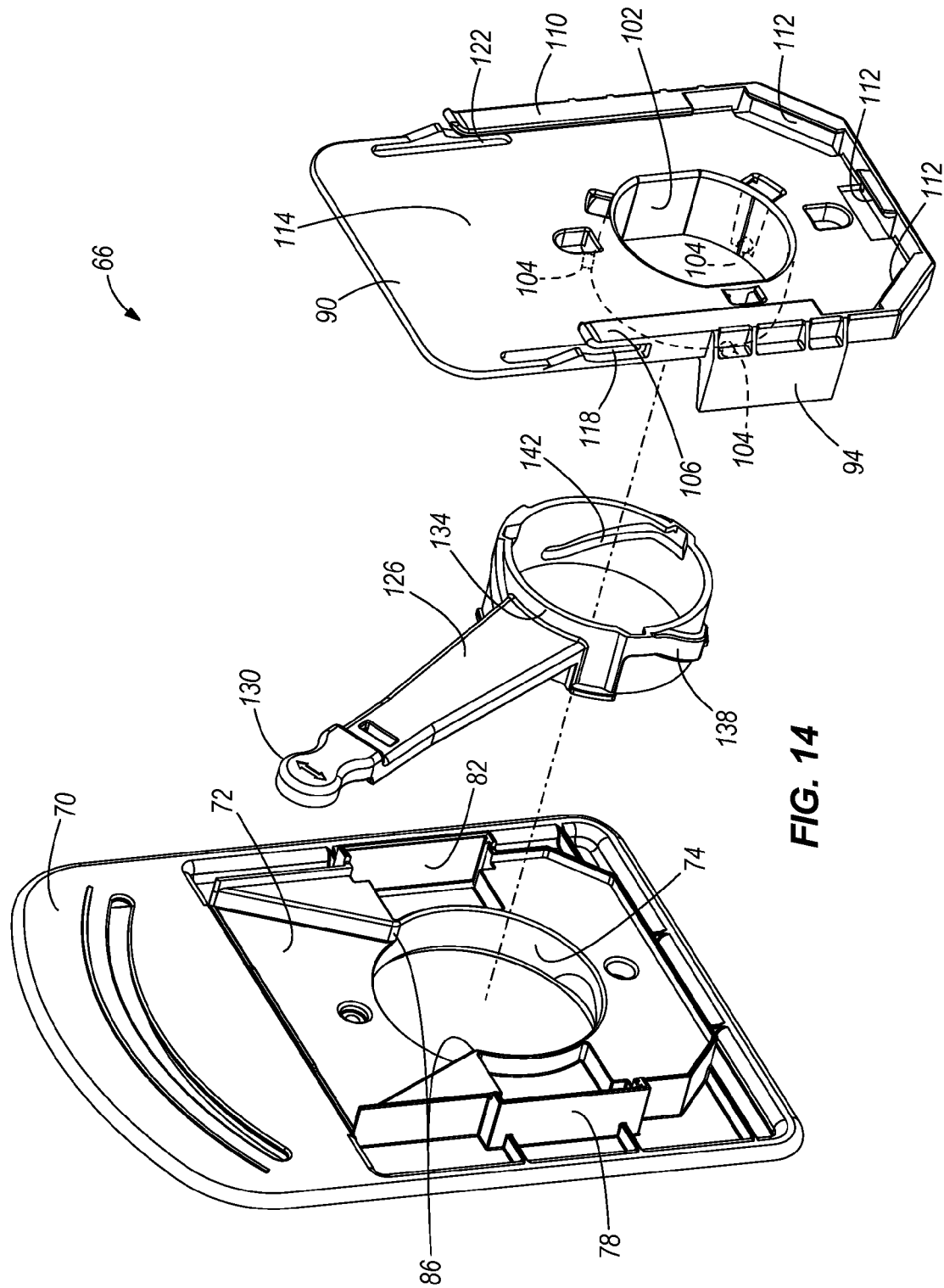
FIG. 14 is an exploded view of the docking assembly of the vacuum cleaner of FIG. 1.
Figure 17G:
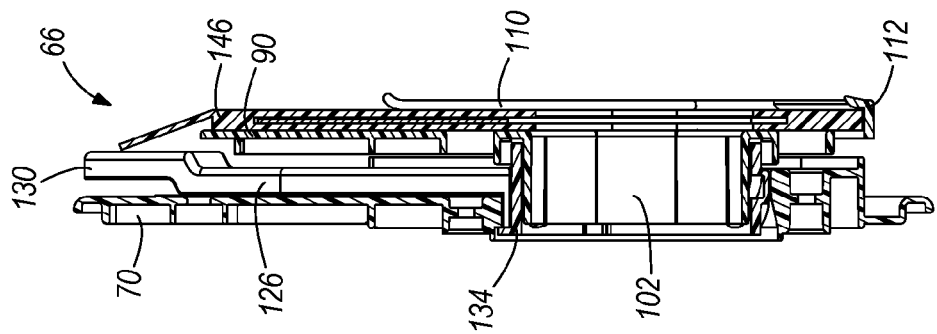
FIG. 17G is a sectional view of the docking assembly taken along the line 17G-17G in FIG. 17A.
Figure 17F:
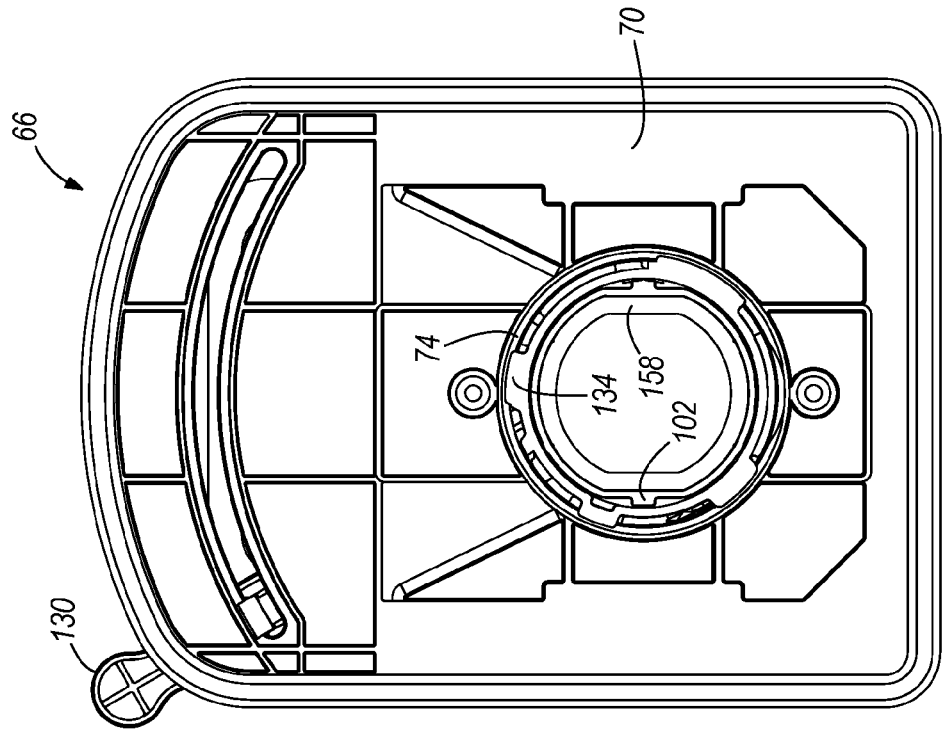
Figure 18:
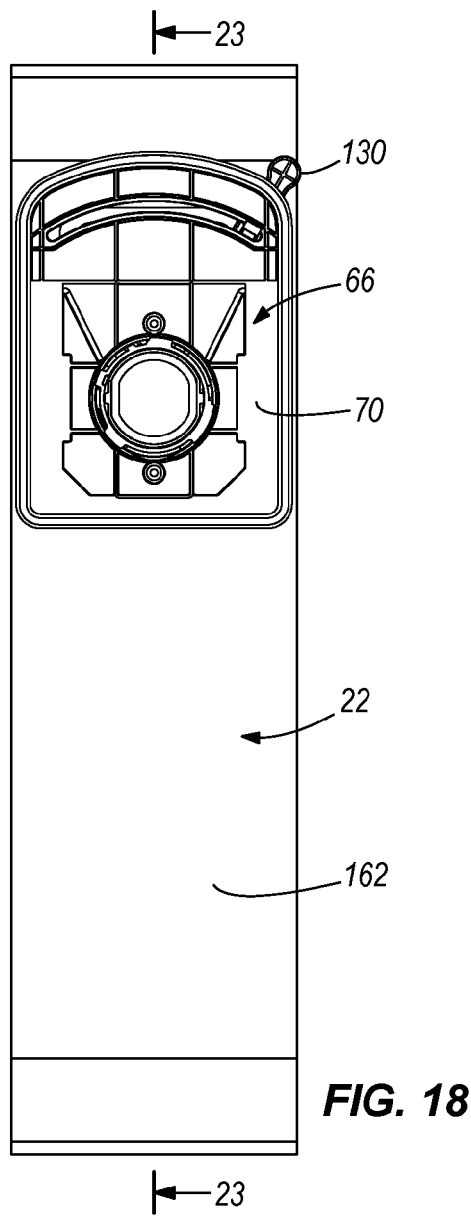
FIG. 18 is a front view of the dirt collection bag associated with the docking assembly.
Figure 19:
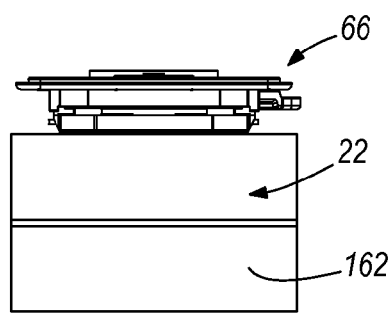
FIG. 19 is a bottom view of the dirt collection bag associated with the docking assembly.
Figure 20:
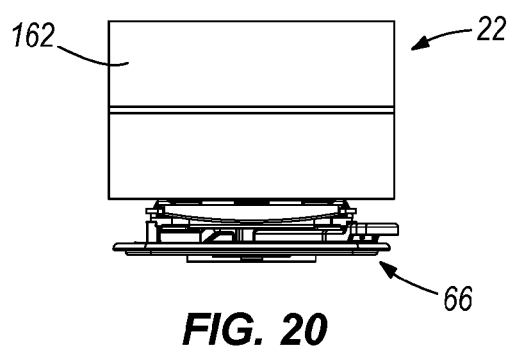
FIG. 20 is a top view of the dirt collection bag associated with the docking assembly.
Figure 21:
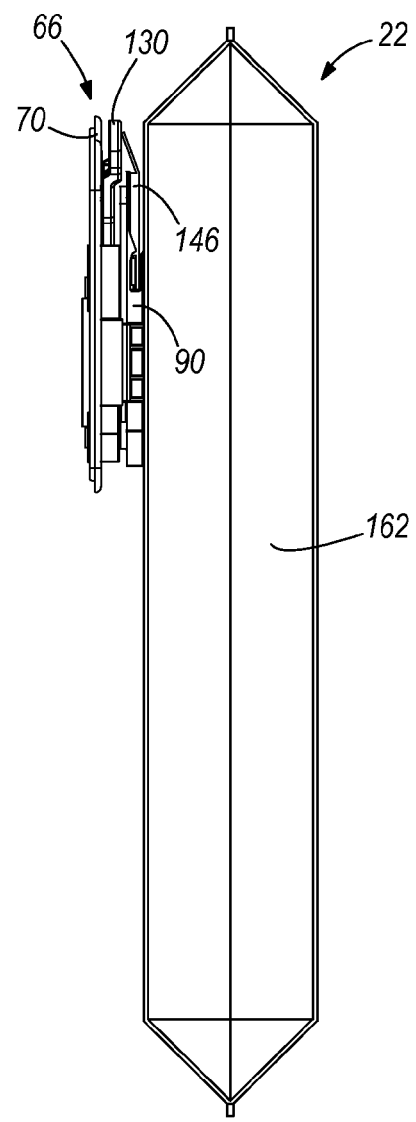
FIG. 21 is a right side view of the dirt collection bag associated with the docking assembly.

With reference to FIGS. 14 and 15, in operation the dirt collection filter bag 22 may be installed onto the vacuum cleaner 10 by first removing a cover 166 from the upper housing assembly 14 (see FIG. 1). The lever 130 is positioned in a first or open position as shown in FIG. 15 such that the bag carrier 90 is in an open position. When in the open position, the bag carrier 90 is spaced a first distance D1 from the main body 70 and the dirt tube 62 is not protruding through the tube 102.

The dirt collection filter bag 22 is then positioned such that the first tab 150 of the collar 146 is positioned in the recess 118 of the first slot 106 and the second tab 154 is positioned in the recess 122 of the second slot 110. The rest of the collar 146 is held in place by protrusions and other geometry of the bag carrier 90, as desired.

With the dirt collecting filter bag 22 in place, the lever 130 is moved from the open position toward the closed position (shown in FIG. 16). When the lever 130 is actuated the main body cam surface 138 and the bag carrier cam surface 142 of the cam handle 126 pulls the bag carrier 90 toward the main body 70. As the lever 130 moves toward the closed position, the bag carrier 90 is moved toward a closed position. While moving toward the closed position, the dirt collecting filter bag 22 is drawn onto the dirt tube 62 such that a press fit and an adequate seal is formed between the dirt tube 62 and the dirt collecting filter bag 22. Specifically, the aperture 158 in the collar 146 seals against the dirt tube 62.

When the bag carrier 90 is in the closed position, the bag carrier 90 is a second distance D2 from the main body 70. The second distance D2 is smaller than the first distance D1 such that the wall 114 is closer to the wall 72 when the bag carrier 90 is in the closed position. The dirt collecting filter bag 22 is installed when the bag carrier 90 is in the closed position.

To remove the dirt collecting filter bag 22, the lever 130 is moved from the closed position to the open position, thereby drawing the dirt collecting filter bag 22 away from the dirt tube 62 such that the dirt collecting filter bag 22 may be easily removed from the vacuum cleaner 10 and disposed of, as desired. When removing the dirt collecting filter bag 22 the first tab 150 and the second tab 154 engage the first slot 106 and the second slot 110, respectively, thereby allowing the bag door 156 to close. Once the bag door 156 is closed a minimal amount of force is required to remove the dirt collecting filter bag 22. The bag door 156 allows the dirt collecting filter bag 22 to close and inhibits the dirt in the expandable body portion 162 from spilling.

The illustrated docking assembly 66 incorporates an easy to use lever 130 that is configured to be moved from side to side to engage and disengage the dirt collecting filter bag 22 from the dirt tube 62. This action requires very little effort from the user and is an action that is easy to initiate. This is an advantage over many other designs which require a significant force to be exerted by the user in order to disengage or engage the dirt collecting filter bag 22. This design does not require a lot of force for operation, and the work to engage and disengage the dirt collecting filter bag 22 is done by the cam design in the cam handle 126, which results in a smoothly operating lever 130 that is actuated by the user.

Various features and advantages of the invention are set forth in the following claims.

What is claimed is:

1. A vacuum cleaner comprising:
    a nozzle;
    an air conduit in communication with the nozzle, the air conduit including a projecting tube;
    a suction source positioned to provide a flow of dirty air from the nozzle, through the air conduit, and out the projecting tube;
    a bag docking assembly including:
        a main body mounted to the air conduit, the main body defining a first aperture sized to receive the projecting tube;
        a bag carrier configured to engage the main body and configured to move between a first position wherein a first distance is defined between the bag carrier and the main body, and a second position wherein a second distance is defined between the bag carrier and the main body, the second distance being smaller than the first distance; and
        a lever coupled to the main body and the bag carrier and configured to move the bag carrier between the first position and the second position; and
    a filter bag selectively coupled to the bag carrier and configured to move therewith, the filter bag defining a second aperture configured to engage the projecting tube, wherein the bag docking assembly is configured such that when the bag carrier is in the first position, the filter bag is not engaged with the projecting tube and when the bag carrier is in the second position, the filter bag is engaged with the projecting tube.

2. The vacuum cleaner of claim 1, wherein the filter bag includes a collar and the bag carrier is configured to selectively engage the collar.

3. The vacuum cleaner of claim 2, wherein the bag carrier defines a recess and the collar includes a projection, the projection configured to be received within the recess such that the collar is coupled to the bag carrier.

4. The vacuum cleaner of claim 1, wherein the main body includes a first cam element, the bag carrier includes a second cam element, and the lever includes a main body cam surface configured to engage the first cam element and a bag carrier cam surface configured to engage the second cam element.

5. The vacuum cleaner of claim 4, wherein the lever is configured to rotate between a first position and a second position to move the bag carrier between the first position and the second position, respectively.

6. The vacuum cleaner of claim 5, wherein the main body cam surface, the first cam element, the bag carrier cam surface, and the second cam element are configured to drive the bag carrier between the first position and the second position as the lever is rotated between the first position and the second position, respectively.

7. The vacuum cleaner of claim 1, wherein the bag carrier includes a bag engagement element with a plurality of slots configured to receive the filter bag and hold the filter bag in position relative to the bag carrier.

8. A filter bag docking assembly for a vacuum cleaner including a filter bag with an opening therein for admitting dirt laden air into an interior portion of the filter bag and a collar defining an aperture therethrough configured for communicating with the opening in the filter body, the collar secured to the filter body and extending outwardly from the aperture and including a bag engagement element, the filter bag docking assembly comprising:
    a main body coupled to the vacuum cleaner;
    a bag carrier including a carrier engagement element configured to selectively engage the bag engagement element; and
    a lever coupled to the main body and the bag carrier and configured to move between a first position and a second position;

wherein the filter bag docking assembly is configured such that when the lever is in the first position a first distance is defined between the bag carrier and the main body; and wherein when the lever is in the second position a second distance is defined between the bag carrier and the main body, the first distance being smaller than the second distance.

9. The filter bag docking assembly of claim 8, wherein the main body defines a first wall and the bag carrier defines a second wall substantially parallel to the first wall, the first distance and the second distance defined as a substantially tangential distance between the first wall and the second wall.

10. The filter bag docking assembly of claim 9, wherein the main body portion includes a first guide element, and the bag carrier includes a second guide element, the first guide element and the second guide element are configured to constrain the movement of the bag carrier such that the second wall is maintained substantially parallel to the first wall throughout movement between the first position and the second position.

11. The filter bag docking assembly of claim 8, the main body includes a first cam element, the bag carrier includes a second cam element, and the lever includes a main body cam surface configured to engage the first cam element and a bag carrier cam surface configured to engage the second cam element.

12. The filter bag docking assembly of claim 11, wherein the lever is positioned between the bag carrier and the main body; and wherein the lever is configured such that when the lever is moved between the first position and the second position, the main body cam surface and the bag carrier cam surface drive the bag carrier, via the first cam element and the second cam element, between a first position and a second position, respectively.

13. The filter bag docking assembly of claim 8, wherein the carrier engagement element includes a recess and the bag engagement element includes a projection, the recess configured to inhibit the removal of the projection therefrom.

14. The filter bag docking assembly of claim 8, wherein the lever includes a user interface configured to be utilized by a user for moving between the first position and the second position.

15. A filter bag docking assembly for a vacuum cleaner, the filter bag docking assembly comprising:

a main body having a first surface and defining a main body aperture therethrough, the main body including a body cam surface and a first guide element;

a bag carrier defining a second surface corresponding to the first surface of the main body, the bag carrier including a second guide element extending substantially transversely from the second surface and coupled to the first guide element of the main body, a carrier engagement element, and a tube extending substantially transversely from the second surface and including a carrier cam surface, the bag carrier configured to move between a first position in which a first distance is defined between the first surface of the main body and the second surface of the bag carrier, and a second position in which a second distance in defined between the first surface of the main body and the second surface of the bag carrier, the first distance being smaller than the second distance;

a lever positioned between the main body and the bag carrier and coupling the bag carrier to the main body, the lever including a wall portion defining a lever aperture, the wall portion sized to be received within the main body aperture of the main body and the lever aperture sized to receive the tube of the bag carrier, an exterior of the wall portion including a first cam surface arranged to engage the body cam surface and an interior of the wall portion including a second cam surface arranged to engage the carrier cam surface, the lever configured to move between a first position and a second position, wherein the first cam surface and the second cam surface engage the body cam surface and the carrier cam surface, respectively, to drive the bag carrier between the first position and the second position; and a filter bag including an expandable body portion and a collar, the expandable body portion defines a bag aperture, the collar defines a collar aperture corresponding with the bag aperture and a bag engagement member configured to engage the carrier engagement member;

wherein the filter bag is mounted to the bag carrier at least partially by engaging the bag engagement member with the carrier engagement member such that the filter bag moves with the bag carrier between the first position and the second position.

16. The filter bag docking assembly of claim 15, wherein the first surface is substantially planar and the second surface is substantially planar.

17. The filter bag docking assembly of claim 16, wherein the first surface and the second surface are configured such that the first surface is substantially parallel to the second surface throughout operation of the filter bag docking assembly.

18. The filter bag docking assembly of claim 15, wherein the first guide element includes a recess and the second guide element includes a projection, the projection configured to be received within the recess.

19. The filter bag docking assembly of claim 15, wherein the wall portion is substantially annular and the lever rotates about the wall portion between the first position and the second position.

20. The filter bag docking assembly of claim 15, wherein the lever includes a user interface configured to be utilized by a user to move the lever between the first position and the second position such that the filter bag may be moved along with the bag carrier between the first position and the second position without the user directly touching any of the filter bag and the bag carrier.

* * * * *